United States Patent [19]

Posma

[11] Patent Number: 4,639,647
[45] Date of Patent: Jan. 27, 1987

[54] FOUR QUADRANT CONTROL OF SERIES MOTORS

[76] Inventor: Bonne W. Posma, 1 Main St., Youngstown, N.Y. 14174

[21] Appl. No.: 713,546

[22] Filed: Mar. 19, 1985

[30] Foreign Application Priority Data

Apr. 4, 1984 [ZA] South Africa ............... 84/2499
Nov. 27, 1984 [ZA] South Africa ............... 84/9258

[51] Int. Cl.⁴ ................................. H02P 7/12
[52] U.S. Cl. .............................. 318/247; 318/246; 318/248; 318/252; 318/426; 318/497
[58] Field of Search .......... 318/245, 246, 247, 248, 318/251, 252, 293, 294, 295, 351, 424, 493, 497, 523, 244, 249, 250, 291, 426

[56] References Cited

U.S. PATENT DOCUMENTS

| | | | |
|---|---|---|---|
| 2,907,941 | 10/1959 | Johnson et al. | 318/251 X |
| 3,050,672 | 8/1962 | Alexanderson | 318/251 X |
| 3,381,200 | 4/1968 | Edwards | 318/332 |
| 3,562,618 | 2/1971 | Tsergas | 318/246 |
| 3,584,281 | 6/1971 | Reeves et al. | 318/258 |
| 3,586,941 | 6/1971 | Fujimaki | 318/246 |
| 3,596,105 | 7/1971 | Segrest | 318/252 X |
| 3,826,959 | 7/1974 | Anderson | 318/345 C X |
| 4,042,864 | 8/1977 | Norris | 318/301 |
| 4,092,577 | 5/1978 | Markham | 318/370 |
| 4,181,875 | 1/1980 | Kohzai et al. | 318/252 |
| 4,259,622 | 3/1981 | Kamenicky et al. | 318/86 |

FOREIGN PATENT DOCUMENTS 3031311 4/1982 Fed. Rep. of Germany ...... 318/246
796893 12/1979 South Africa .
0629617 9/1978 U.S.S.R. ............................. 318/293

OTHER PUBLICATIONS

Krings, B. J., "Alternative Systems for Rapid-Transit Propulsion", Westinghouse Engineer, Mar. 1973, pp. 34-41.

IBM Technical Disclosure Bulletin, vol. 7, No. 11, p. 990, Apr. 1965, "Multimode Control of DC Series Motor", by T. R. Fredriksen.

Primary Examiner—Charles D. Miller
Assistant Examiner—Bentsu Ro
Attorney, Agent, or Firm—Arnold, White & Durkee

[57] ABSTRACT

A method of controlling and a controller for controlling at least one series motor is provided. Rectifier means is connected in series with the motor so that current through a field winding of the motor is always in the same direction irrespective of the polarity of the input voltage while the current direction through an armature of the motor reverses in accordance with the polarity of the input voltage. An energizing current is applied to the field winding by a bias power supply to ensure that the field winding always produces some flux during operation of the motor.

16 Claims, 6 Drawing Figures

FOUR QUADRANT CONTROL OF SERIES MOTORS

This invention relates to controlling motors. It relates in particular to controlling the speed and/or torque of series motors, ie. motors where the field winding is connected in series with the armature.

In certain applications, eg when driving a crane, mining vehicle, and so on, it is desirable that a drive motor be capable of driving in both a forward and reverse direction and also to use the motor as a brake. Series motors suffer from the disadvantage that it is not possible to reverse the direction of rotation of the motor by simply reversing the polarity of the input current because as the polarity of the current reverses, the field set up by the field winding reverses at the same time as the current through the armature and the torque direction therefore remains the same. Series motors normally have four input connections, ie. two for the field winding and two for the armature. It is desirable to control series motors without providing additional input connections as is required in compound motors. It is an object of this invention to offer a solution to these problems.

In accordance with the invention a method of controlling at least one series motor includes connecting rectifier means in series with the motor so that current through a field winding of the motor is always in the same direction irrespective of the polarity of the input voltage while the current direction through an armature of the motor reverses in accordance with the polarity of the input voltage, and applying an energising current to the field winding to ensure that the field winding always produces some flux during operation of the motor so that a CEMF (Counter EMF) always exists whenever the motor rotates, whether or not armature current flows.

Further according to the invention there is provided a controller for controlling at least one series motor, the controller including control means operable to vary the polarity and voltage supplied to the motor, rectifier means intermediate the control means and the motor and operable to supply current in one direction only through a field winding of the motor irrespective of the polarity of the voltage supplied by the control means and operable to supply current with reversible polarity to an armature of the motor in accordance with the polarity of the voltage supplied by the control means, and a bias power supply connectable to the field winding and operable to produce field flux during all stages of operation of the motor.

The rectifier means conveniently is in the form of a full wave bridge rectifier, one pair of connections of which are connected to the control means and the armature of the motor respectively, and an opposite pair of connections of which are connected to opposing sides of the field winding.

The control means may, for example, be in the form of a model DE8 or DC12 controller currently produced by Saftronics, Inc, of Youngstown, N.Y., USA and Stratford, Ontario, Canada. Such a controller is capable of supplying both positive and negative varying DC voltage. Other forms of control means are possible which provide a variable voltage and/or variable polarity output from an AC or DC source. The output voltage of the control means may be controlled by thyristors such as SCR's, Triacs, GTO's, Power Transistors, or the like.

The bias power supply avoids the situation when, during the change in polarity of the control means, a momentary absence of flux produced by the field winding could arise, and there would be no counter-EMF generated by the armature of the motor to cause braking. Then, when reverse current starts to flow, the flux would be re-established and there would be a sudden reversal of armature voltage causing a severe current surge until the motor stops and reverses rotation. The bias power supply thus provides field flux when no armature current flows to allow back EMF generation. The bias power supply also prevents the motor generating dangerously high speeds should the load on the motor be removed and provides separate excitation to the field winding during regeneration to achieve equivalent shunt motor mode regenerative braking. The bias power supply may include a transformer connectable to an AC mains supply and a rectifier for rectifying the output of the transformer.

The bias power supply may supply an energising current to the field winding even when there is no current flow through the armature of the motor supplied from the control means. When the motor is at a standstill and not in use, the bias power supply may be switched off by cut out means.

The bias power supply may also be adjustably variable. In certain applications the bias power supply may be controlled dependent upon the rotational speed of the motor, eg via a tachogenerator connected to the motor or to its load, or may be made dependent upon armature current flow. Armature current sensing means may then be provided to control the supply of current to the field winding in response to changes in armature current.

The controller may be used for controlling a plurality of motors driving a common load. The armatures of the motors may then be connected in series and the field windings of the motors may be connected in series also. In another arrangement, the armatures may be connected in parallel while the field windings are connected in series with each other. In still a further arrangement, the field windings may be connected in parallel with each other and the armatures in series.

The rectifier means may be connected in series with each field winding or a separate rectifier means may be provided for each field winding.

If desired, the field winding and rectifier means associated with a first motor may be connected in series with the armature of a second motor, and the field winding and rectifier means associated with the second motor may be connected in series with the armature of the first motor.

The controller may include detection means operable to detect a regenerative condition of the motor, the detection means being operable to operate switch means thereby to isolate the field winding from the armature to change the series motor to an equivalent shunt motor during regeneration.

The switch means may include a shunting SCR connected across the rectifier means and operable, when the SCR is switched on, to provide a short circuit across the rectifier means. A blocking diode connected intermediate the rectifier means and the field winding may be reverse biassed when the SCR is on thereby effectively preventing armature current from flowing through the field winding. The SCR may be arranged to switch off while the motor is driving a load and to switch on when the motor is being driven by the load, eg. when a vehicle driven by the motor is travelling down hill.

Timing means may be provided operable to preserve the bias power supply to the field winding during regenerative braking.

Various embodiments of the invention are now described by way of example with reference to the accompanying drawings, in which.

Figure 1:
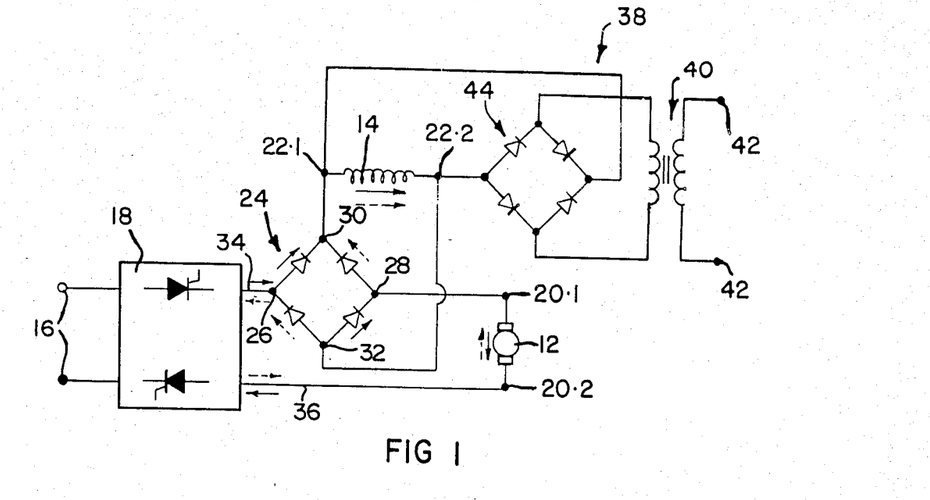
FIG. 1 shows a schematic circuit diagram of a controller in accordance with the invention.

FIG. 1 generally indicates a controller for controlling a series motor comprising an armature 12 and a field winding 14. In this embodiment, the motor is supplied with power from an AC mains source connected to terminals 16. Control means capable of providing a variable output voltage with variable polarity is generally indicated by reference numeral 18. The control means 18 could typically be a Series DE8 single phase regenerative controller or a Series DC12 three phase regenerative controller made by Saftronics, Inc.

The motor has four input connections namely connections 20.1 and 20.2 connected to the armature 12 and connections 22.1 and 22.2 connected to the field winding 14.

In accordance with the invention, rectifier means in the form of a full wave bridge rectifier 24 is connected in series with the field winding 14. The connections 26 and 28 of the rectifier 24 are connected to the control means 18 and the armature 12 respectively while the connections 30 and 32 are connected to opposed sides of the field winding 14.

As indicated by the arrows in full lines, while output line 34 of the control means 18 is positive, current will flow through the field winding 14 in the direction from terminal 22.1 to terminal 22.2. Current will also flow through the armature 12 in the direction from terminal 20.1 to terminal 20.2.

If however the polarity of the control means 18 is reversed and output line 36 is positive, current will flow in the direction as indicated by the arrows in dotted lines, ie. in the reverse direction through the armature 12 from terminal 20.2 to 20.1 but in the same direction through the field winding 14 from terminal 22.1 to terminal 22.2.

This permits the direction of rotation of the armature 12 to be reversed dependent upon the polarity of the voltage emitted by the control means 18. The speed of the motor is also controlled dependent upon the voltage level emitted by the control means 18.

The controller illustrated in FIG. 1 could suffer from the disadvantage that when the polarity is reversed, there is no smooth power regeneration as there is no motor torque when the current reverses in view of the absence of flux produced by the field winding 14 and hence there is no counter-EMF generated by the armature 12. Once reverse current is established, the flux is re-established but there is then a sudden reversal of armature voltage adding to the voltage provided by the control means 18 and consequently a severe current surge occurs until the motor is brought to a stop and reverses rotation.

This problem is solved by the addition of a bias power supply generally indicated by reference numeral 38. The bias power supply 38 includes a transformer 40 connected to an AC mains supply on terminals 42 and a full wave bridge rectifier 44 supplying power to the field winding 14. The bias power supply thus continuously energises the field winding 14 ensuring that there is always some flux produced by the field winding. With the addition of the bias power supply 38, it is possible to obtain smooth forward and reverse speed control and rapid smooth regeneration during voltage reversal. Also, if the load on the motor is removed, the motor does not overspeed in view of the flux generated by the field winding 14 resulting from the energising current from the bias power supply 38.

Figure 2:
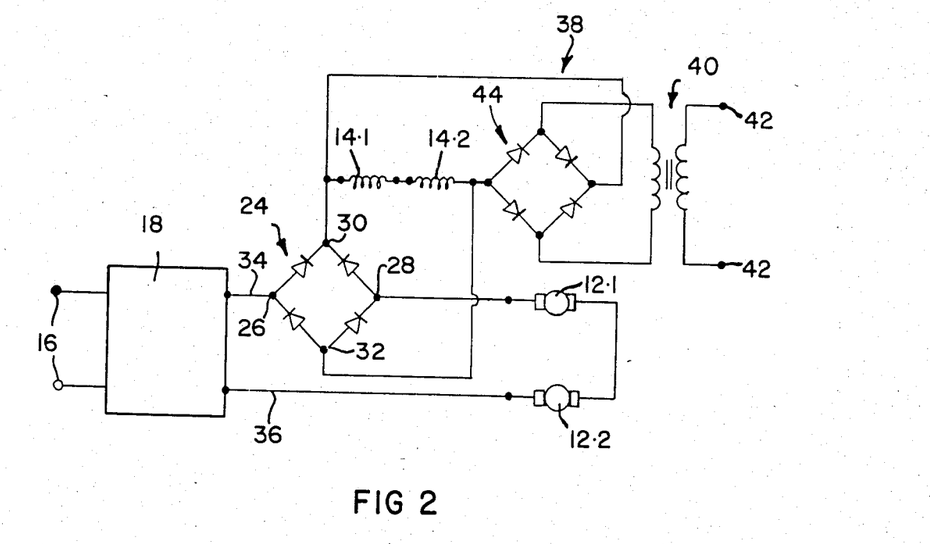
FIG. 2 shows a schematic circuit diagram of a controller in accordance with the invention controlling a plurality of motors.

In certain applications such as in mining vehicles, cranes, and the like, a plurality of series motors can be connected to drive a common load. In such an embodiment as illustrated in FIG. 2, two motors have their respective field windings 14.1 and 14.2 connected in series and their respective armatures 12.1 and 12.2 connected in series. Again, irrespective of the polarity emitted by the control means 18, while the direction of current flow through the armatures 12.1 and 12.2 will vary in accordance with the polarity of the output voltage of the control means 18, the direction of current flow through the field windings 14.1 and 14.2 remains the same. If desired, more than two motors can be connected in this way to a common load. Also, instead of the armature 12.1 and 12.2 being connected in series with each other, they could be connected in parallel. Also the field windings 14.1 and 14.2 could be connected in parallel with each other or both the field coils and the armatures could be connected in parallel.

As in FIG. 1, a bias power supply 38 supplies a constant voltage to both field windings 14.1 and 14.2.

Figure 3:
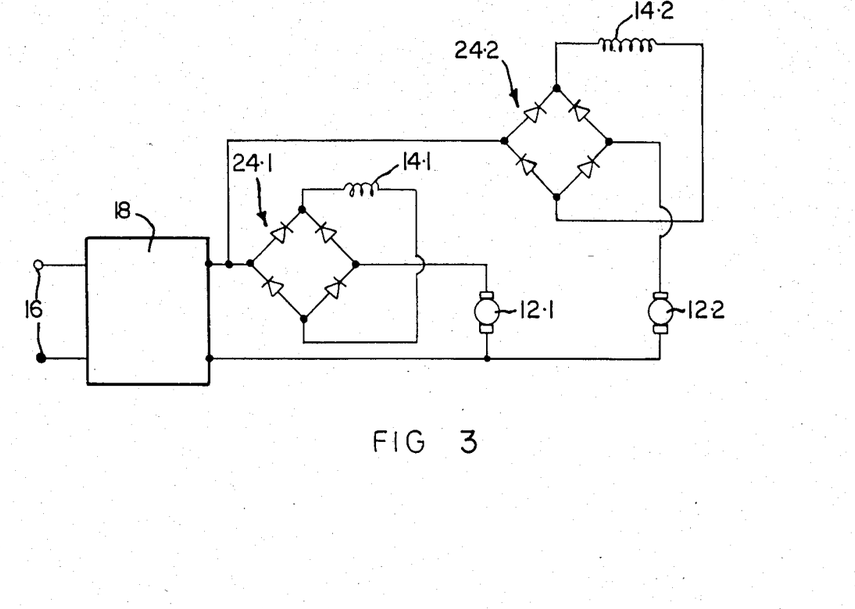
FIG. 3 shows a schematic circuit diagram of a further form of controller in accordance with the invention controlling a plurality of motors and wherein each field winding has its own rectifier means.

In the FIG. 3 embodiment, a modification is shown in which each field winding 14.1 and 14.2 has its own full wave bridge rectifier 24.1 and 24.2. The FIG. 3 embodiment would also have a bias power supply 38 (not shown), as in the previous embodiments for each field winding 14.1 and 14.2.

It would be appreciated that instead of the arrangement as shown in FIG. 3, the rectifier 24.1 and field winding 14.1 could be connected in series with the armature 12.2 and the rectifier 24.2 and the field winding 14.2 in series with the armature 12.1. Again, more than two motors can be connected in this fashion.

It will be appreciated further that the control means 18 can be varied to operate from a DC source rather than an AC source. The control means 18 can comprise a variety of forms of thyristors such as silicon controlled rectifiers, a combination of silicon controlled rectifiers and diodes, triacs, GTO's and/or transistors. The control means 18 can also be operated from a three phase AC supply.

It will also be appreciated that the bias applied by the bias power supply 38 could be variable. If desired, the bias power supply may be controllably variable dependent upon the speed of the motor, eg as determined by a tachogenerator connected to the motor or to its load.

Figure 4:
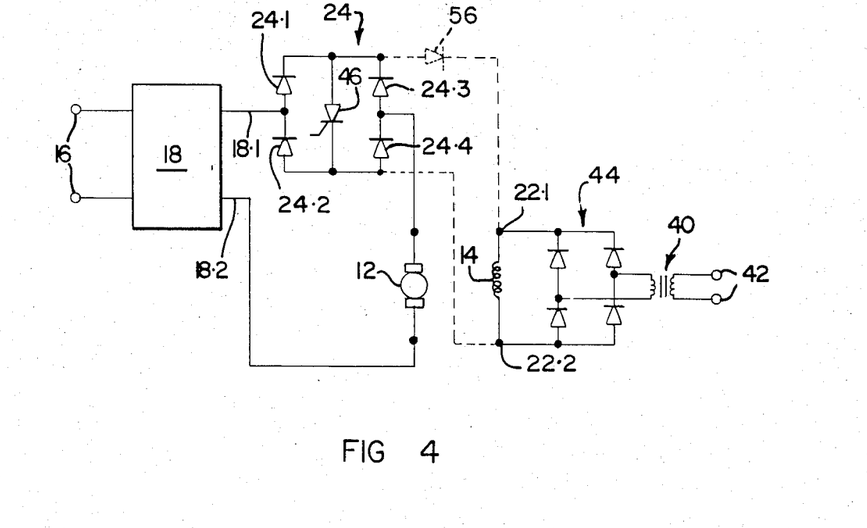
FIG. 4 shows a schematic circuit diagram of a controller controlling a series motor in shunt motor mode.

FIG. 4 illustrates how a 4 terminal series motor can be connected in an equivalent 'shunt motor' mode. The dotted lines indicate actual connections, but as described below, no current flows through these connections.

As before, the controller 18 may be a reversible, variable voltage controller. An armature bridge rectifier 24 comprising diodes 24.1, 24.2, 24.3 and 24.4 is furnished with a shunting SCR 46 which in this example, is caused to turn 'ON' by means of a continuous stream of pulses being applied to its gate, by means not shown in this example.

A bias field supply bridge 44 is again supplied with AC by means of a transformer 40 which is connected to an AC supply via terminals 42. It therefore supplies a steady DC supply to the field winding 14 as depicted, causing the field winding terminal 22.1 to be positive with respect to terminal 22.2.

Since the SCR 46 effectively presents a short-circuit across the armature rectifier bridge 24, this means that a blocking diode 56 is reverse biased, and is effectively not in the circuit.

The arrangement shown in FIG. 4 forms the equivalent of a shunt motor, with the field winding 14 separately excited by a fixed DC field supply from the bridge rectifier 44, and the armature 12 being supplied with a variable voltage supply via the controller 18 and the armature bridge rectifier 24.

When the output 18.1 of the controller 18 is positive, current flows through the diode 24.1, SCR 46, diode 24.4, armature 12 and back to the negative line 18.2. Because SCR 46 presents a short circuit across the bridge 24, none of the armature current can flow through the field winding 14, so a 'shunt motor' characteristic is obtained.

When line 18.2 is positive with respect of line 18.1, current flows from line 18.2 through the armature 12, diode 24.3, SCR 46, diode 24.2 and thence to line 18.1. Again, none of this current can flow through the field winding 14, because of the shorting action of SCR 46. However, in this case, current direction through the armature 12 has been reversed, while current direction through the field winding 14, supplied from the bridge rectifier 44, has remained constant. Thus, the motor will now rotate in the opposite direction compared to when line 18.1 was positive to line 18.2. Again, a 'shunt motor' motor characteristic is obtained.

If, instead of the motor driving the load, the load was overhauling, that is, driving the motor, then, provided the controller 18 was capable of regenerating power back into the mains, such as is the case with fully controlled reversible SCR bridges such as the Saftronics DE8 and DC12 controllers, regenerative braking would occur in both directions under appropriate conditions of current flow through the armature 12 with respect to motor rotation. In the case of the configuration of FIG. 4, such regeneration would occur under 'shunt motor' mode conditions, and would be smoothly and easily controllable.

Figure 5:
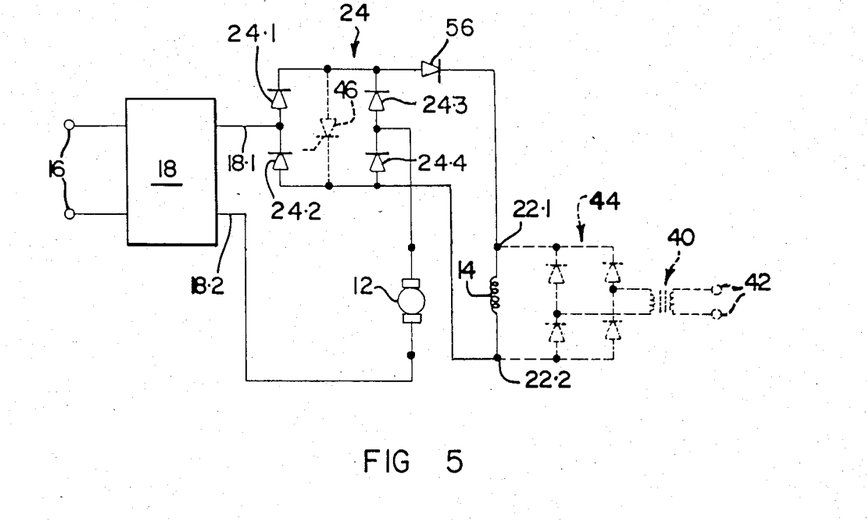
FIG. 5 shows a schematic circuit diagram of a controller controlling a series motor in series motor mode.

Referring to FIG. 5 a 'series motor' mode configuration is shown, achieved simply by not turning SCR 46 on. Throughout this description, SCR 46 will be kept off and thus has no effect on current flow. It is therefore shown in dotted lines.

The fixed DC power supply comprising the rectifier bridge 44 and the transformer 40 connected to an AC supply 42 is also shown in dotted lines. Although it is continuously on, it makes no contribution to the current supplied to the field winding 14 whenever substantial current flows through the armature 12 of the series motor.

Suppose the line 18.1 of reversible, variable voltage controller 18 is positive with respect, and the line 18.2 is negative. With SCR 46 in the off state, current flow will be through diode 24.1, diode 56, field winding 14, diode 24.4, armature 12 and thence to line 18.2. There is thus a 'series motor' characteristic, with the motor turning in one direction.

Suppose the line 18.2 is positive with respect to the line 18.1. In such a case current flow is from the line 18.2 through the armature 12, diodes 24.3 and 56, field winding 14, diode 24.2 and to line 18.1. Note that current flow through the armature 12 has reversed, yet in the field winding 14 it is still the same as when line 18.1 was positive with respect to line 18.2. The motor will still operate in a 'series mode' but with an opposite direction of rotation.

Figure 6:
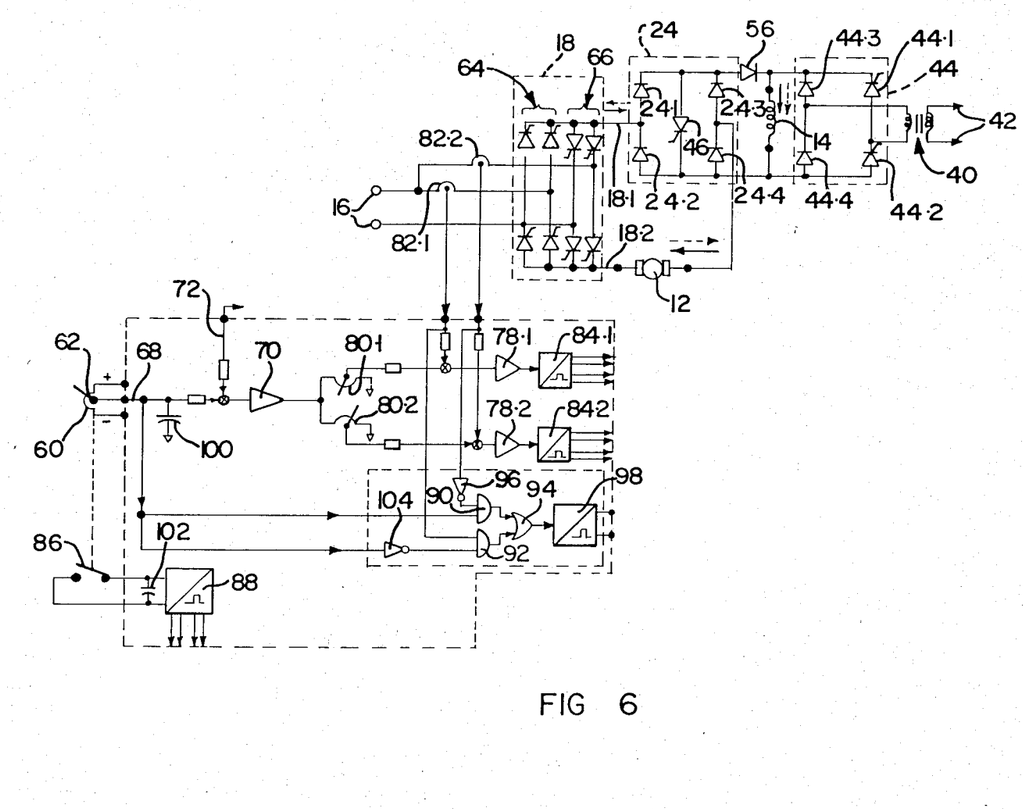
FIG. 6 shows a schematic circuit diagram of a controller providing both forward and reverse series motor mode motoring and regenerative shunt motor mode braking in both directions of rotation.

In many applications, it is desirable to operate the motor in a 'series motor' mode when 'motoring' or 'driving' a load, in order to take advantage of a series motor's high starting torque performance, but to operate it in a 'shunt motor' mode characteristic when regenerative braking is desired, in order to take advantage of a shunt motor's excellent controllability under regenerative braking conditions. FIG. 6 shows how these requirements are met.

FIG. 6 illustrates a typical form of controller with the further advantage that it provides 'series motor' mode forward and reverse driving, and 'shunt motor' mode regenerative braking for both forward and reverse driving. As well, the bias power supply can be switched on and off to reduce heating when the motor is at standstill.

The controller 18 is connected to an operator's speed control potentiometer 60 which may be in a form of a joystick or footswitch assembly. Moving the lever 62 of the potentiometer 60 in a clockwise direction towards positive causes a SCR bridge 64 to activate, to cause forward motion. Moving the lever 62 in an counterclockwise direction towards negative causes a SCR bridge 66 to activate, to cause reverse motion. Each of the bridges 64 and 66 comprises four SCR's.

The variable voltage/variable polarity signal generated by the potentiometer 60 on a speed reference line 68 is connected to a voltage error amplifier 70. A voltage feedback signal on line 72 is also connected to the amplifier 70 and the error between the signals establishes a current reference for either the bridge 64 current controller or the bridge 66 current controller, the selection of the bridge being dependent on the output polarity of the signal from the amplifier 70.

Suppose the operator wishes to 'drive' the motor forward and moves the speed reference potentiometer lever 62 towards positive. In this case, the voltage amplifier 70 generates a polarity such that a current amplifier 78.1 controlling the bridge 64 is in operation. The magnitude of the signal supplied to the amplifier 78.1 is established by a current reference potentiometer 80.1 which provides a current reference to the amplifier 78.1. Current feedback from the bridge 64 is provided by a current transformer 82.1, and the error between desired current and actual current establishes the magnitude of the output signal provided to a pulse generator 84.1, which causes the bridge 64 to provide a variable voltage output substantially as required to give the desired forward motion.

Similarly, if the operator desires reverse motion, the potentiometer lever 62 is moved towards negative, causing the bridge 66 to activate via the voltage amplifier 70, a current reference potentiometer 80.2, a current error amplifier 78.2, a current feedback transformer 82.2, pulse generator 84.2 and the SCR bridge 66.

The potentiometer 60 is so configured that it is physically connected to cut out means in the form of a control switch 86 which is open in the neutral position of potentiometer 60, but closes whenever the operator moves the potentiometer 60 in either the forward or reverse direction. Thus, with the potentiometer at neutral, the switch 86 is open, a pulse generator 88 is inhibited, and SCR 44.1 and SCR 44.2 of bias supply bridge 44 are off. This eliminates extra motor heating when the motor is at standstill. Whenever the potentiometer 60 is moved away from neutral, the switch 86 closes to activate the pulse generator 88 and so provide continuous gating pulses to SCR 44.1 and SCR 44.2 which together with bias supply diodes 44.3 and 44.4 and bias supply transformer 40 provide a bias voltage to the field winding 14 of the motor. In this embodiment, the pulse generator 88 provides either on or off control in response to the switch 86, however, it could be connected to provide continuously variable field supply if desired.

Suppose the bridge 64 is on and SCR 46 is off. In this case, line 18.1 is positive and line 18.2 is negative. Current will then flow via diode 24.1, diode 56, field winding 14, diode 24.4 and armature 12, as indicated by the solid arrows.

Suppose bridge 66 is on and SCR 46 is off. Current will then flow via armature 12, diodes 24.3 and 56, field winding 14 and diode 24.2, as indicated by the broken arrows.

In both cases current direction in the series field winding 14 is the same, however it reverses in the armature 12. Thus, the bridge 64 provides one direction, and the bridge 66 provides the opposite direction of motion during motoring operation.

Suppose now that the operator is moving forward with bridge 64 in operation and suddenly returns potentiometer 60 to a lower forward position. In such a case, the feedback voltage on line 72 supplied to the voltage error amplifier 70 exceeds the forward reference voltage on line 68. The amplifier 70 will then immediately call for maximum opposing braking current. Consequently the bridge 64 will cease to supply current to the motor, and the bridge 66 will supply an opposing current.

AND gates 90 and 92 are constantly monitoring speed reference polarity and which bridge is conducting as established by signals from the current transformers 82.1 and 82.2. The table below determines what happens:

|  |  | AND GATE 90 | AND GATE 92 | OR GATE 94 | SCR46 |
|---|---|---|---|---|---|
| Condition 1 (Motoring) | FORWARD REFERENCE (+) Bridge 64 Current (Current transformer 82.1) (+) | OFF | OFF | OFF | OFF |
| Condition 2 (Motoring) | REVERSE REFERENCE (−) Bridge 66 Current (Current Transformer 82.2) (−) | OFF | OFF | OFF | OFF |
| Condition 3 (Regenerative) | FORWARD REFERENCE (+) Bridge 66 Current (Current Transformer 82.2) (−) | ON | ON | ON | ON |
| Condition 4 (Regenerative) | REVERSE REFERENCE (−) Bridge 64 Current Current Transformer 82.1) (+) | ON | ON | ON | ON |

Thus, if the operator pulls the potentiometer 60 back to a lesser forward signal, condition 3 obtains. In this condition, AND gate 90 is supplied with a positive reference signal and a positive current signal from the bridge 66, via an inverter 96. Thus OR gate 94 is turned on and so is pulse generator 98, which in turn causes SCR 46 to turn on.

With SCR 46 on, the series motor has been switched to a 'shunt' motor because the armature current that would normally flow through the field has been bypassed by SCR 46. The bridge 44 supplies a fixed field supply which cannot flow through SCR 46 because of the blocking diode 56. Thus, in the case of bridge 66 operating under regenerative conditions, current flow is from line 18.2 through the armature 12, diode 24.3, SCR 46, diode 24.2 and back to line 18.1.

The motor is thus brought swiftly and smoothly to a lower speed under 'shunt motor' conditions.

Once the new speed is obtained, current in bridge 66 ceases to flow, gate 90 turns off, and so does SCR 46. The motor is now ready for motoring in the 'series' mode at a lower speed as described previously.

A similar situation might arise in the case of an electronic vehicle running down a hill. In this case, even though there could be maximum forward reference from the potentiometer 60, the voltage generated by the motor's armature, rotating in a flux field established by the fixed bias supply 44 could exceed the reference voltage, and thus cause the bridge 66 to turn on, thus causing AND gate 90 to detect a regenerative condition, and causing SCR 46 to turn on, and so provide smooth regenerative braking in the motor shunt mode condition, until the desired lower speed is achieved.

A small time delay for the presence of a speed reference signal on line 68 is provided by a time delay circuit represented by capacitors 100 and 102, to provide a memory for AND gates 90 and 92 and bias field supply bridge 44 respectively. Thus, if the operator were to go from full forward to 'neutral', regeneration to stop in the 'shunt motor' mode would still occur.

Similarly, SCR 46 would detect regenerative braking for reverse motion. This is achieved via AND gate 92, which looks at an inverted negative reference signal from an inverter 104 and monitors current from the bridge 64. When AND gate 92 detects negative reference and current in bridge 64, it causes by-pass SCR 46 to trigger via OR gate 94 and pulse generator 98.

It is important that during regenerative braking to stop, that the bias field is preserved. This is achieved by means of a time delay circuit for SCR 44.1 and SCR 44.2 and pulse generator 88, represented by capacitor 102, which keeps the bias field bridge 44 on for a few seconds even after the operator has returned potentiometer 60 to neutral, thereby opening switch 86.

Lastly, this drive system is not harmed if the operator moves the lever from forward to reverse since the instantaneous forward and reverse current limit circuits always ensure that excessive motor currents cannot arise.

The invention illustrated provides a controller for a series motor which permits both the speed and direction of rotation of the motor to be controlled. This is achieved without modification of the series motor and by simple connection of the controller to the conventional four terminals of the motor. The motor can be used in various modes of operation, namely in first quadrant mode where motoring only occurs and in fourth quadrant mode where motoring and regenerative braking occurs. The controller provides automatic regeneration as soon as the motor speed is reduced without the necessity of an operator reducing speed of the motor by reversing the motor. The bias power supply permits smooth automatic regenerative action which can be sensed by the controller and avoids the need for a mechanical brake when a vehicle driven by the motor is proceeding down hill.

What I claim is:

1. A method of controlling at least one series motor which includes connecting rectifier means in series with the motor so that current through a field winding of the motor is always in the same direction irrespective of the polarity of the input voltage while the current direction through an armature of the motor reverses in accordance with the polarity of the input voltage, applying an energizing current to the field winding to ensure that the field winding always produces some flux during operation of the motor, and detecting a regenerative condition of the motor, and when detected, causing a switching action to take place to isolate the field winding from the armature thereby to change the series motor to an equivalent shunt motor.

2. A method as claimed in claim 1, which includes varying the energising current to the field winding to vary the flux produced by the field winding dependent upon the rotational speed of the motor.

3. A controller for controlling at least one series motor, the controller comprising: control means operable to vary the polarity and voltage supplied to the motor, rectifier means intermediate the control means and the motor and operable to supply current in one direction only through a field winding of the motor irrespective of the polarity of the voltage supplied by the control means and operable to supply current with reversible polarity to an armature of the motor in accordance with the polarity of the voltage as supplied by the control means, a bias power supply connectable to the field winding and operable to produce field flux during all stages of operation of the motor, and detection means operable to detect a regenerative condition of the motor and operable when such a condition is detected to operate a switch means thereby to isolate the field winding from the armature to change the series motor to an equivalent shunt motor during regeneration.

4. A controller as claimed in claim 3, in which the bias power supply includes a transformer connectable to an AC mains supply and a rectifier for rectifying the output of the transformer.

5. A controller as claimed in claim 3, which includes cut out means operable to isolate the bias power supply when the motor is at a standstill and not in use.

6. A controller as claimed in claim 3, in which the bias power supply is controlled to be adjustably variable dependent upon the rotational speed of the motor.

7. A controller as claimed in claim 3, for controlling a plurality of series motors driving a common load, the armatures of the motors being connected in series and the field windings of the motors being connected in series with one another also, and which includes separate rectifier means for each field winding.

8. A controller as claimed in claim 3, in which the switch means includes a shunting SCR connected across the rectifier means and operable, when the SCR is switched on, to provide a short circuit across the rectifier means.

9. A controller as claimed in claim 8, which includes a blocking diode operable when the SCR is on, to be reversed biassed, the blocking diode serving to isolate the bias power supply from the rectifier means thereby effectively preventing armature current from flowing through the field winding.

10. A controller as claimed in claim 8, in which the SCR is arranged to switch off when the motor is driving a load and to be switched on when the motor is being driven by the load.

11. A controller as claimed in claim 3, which includes timing means operable to preserve the bias power supply to the field winding during regenerative braking.

12. A method of controlling at least one series motor, comprising:
   connecting rectifier means in series with the motor so that current through a field winding of the motor is always in the same direction irrespective of the polarity of the input voltage while the current direction through an armature of the motor reverses in accordance with the polarity of the input voltage; applying an energizing current to the field winding by means of a bias supply to ensure that the field winding always produces some flux during operation of the motor so that counter EMF exists when the motor rotates, whether or not armature current flows; detecting a regenerative condition of the motor; and isolating the field winding from the armature when a regenerative condition is detected.

13. A method as claimed in claim 12, which includes varying the energizing current supplied by the bias supply to the field winding to vary the flux produced by the field winding dependent upon the rotational speed of the motor.

14. A controller for controlling at least one series motor, the controller comprising:
   control means operable to vary the polarity and voltage supplied to the motor;
   rectifier means intermediate the control means and the motor for supplying current in one direction only through a field winding of the motor irrespective of the polarity of the voltage supplied by the control means and for supplying current with reversible polarity to an armature of the motor in accordance with polarity of the voltage as supplied by the control means;

bias power supply means connectable to the field winding for producing field flux during all stages of operation of the motor to produce counter EMF when the motor rotates, whether or not armature current flows; and means for detecting a regenerative condition of the motor and for operating a switch means when said regenerative condition is detected to isolate the field winding from the armature.

15. A controller as claimed in claim 14, wherein the bias power supply means includes a transformer connectable to an AC supply and means for rectifying the output of the transformer.

16. A controller as claimed in claim 14, wherein said switch means includes a shunting SCR connected across the rectifier means to provide a short circuit across the rectifier means when the SCR is switched on.

* * * * *

UNITED STATES PATENT AND TRADEMARK OFFICE
CERTIFICATE OF CORRECTION

PATENT NO. : 4,639,647

DATED : January 27, 1987

INVENTOR(S) : Bonne W. Posma

It is certified that error appears in the above-identified patent and that said Letters Patent is hereby corrected as shown below:

In Column 4, line 42, please delete "armature" and insert therefor -- armatures --;

In Column 5, line 52, after the words "was positive" please insert -- with respect --;

In Column 5, line 53, please delete "motor" and insert therefor -- mode --; and

In Column 6, line 11, please delete "with respect".

Signed and Sealed this

Twenty-first Day of April, 1987

Attest:

DONALD J. QUIGG

*Attesting Officer*  *Commissioner of Patents and Trademarks*